United States Patent [19]

Kübert et al.

[11] Patent Number: 5,300,368
[45] Date of Patent: Apr. 5, 1994

[54] HIGHLY WEAR-RESISTANT OVERLAY WITH IMPROVED SLIP AND A METHOD OF ITS PRODUCTION

[75] Inventors: Michael Kübert, Klein-Winternheim; Klaus Müller, Wiesbaden-Naurod, both of Fed. Rep. of Germany

[73] Assignee: Glyco-Metall-Werke Glyco B.V. & Co. KG, Wiesbaden, Fed. Rep. of Germany

[21] Appl. No.: 768,088

[22] PCT Filed: Jan. 26, 1991

[86] PCT No.: PCT/DE91/00079

§ 371 Date: Sep. 25, 1991

§ 102(e) Date: Sep. 25, 1991

[87] PCT Pub. No.: WO91/11545

PCT Pub. Date: Aug. 8, 1991

[30] Foreign Application Priority Data

Feb. 3, 1990 [DE] Fed. Rep. of Germany ....... 4003225

[51] Int. Cl.$^5$ .................. F16C 33/12; F16C 33/14; C22F 1/00; B32B 15/01

[52] U.S. Cl. .................... 428/610; 428/642; 428/643; 428/646; 428/941; 148/518; 148/527; 148/537; 384/912

[58] Field of Search ............. 428/610, 643, 644, 645, 428/646, 647, 648, 941; 384/912, 913; 148/516, 537, 518, 527

[56] References Cited

U.S. PATENT DOCUMENTS

| | | | |
|---|---|---|---|
| 2,288,656 | 7/1942 | Smart | 428/610 |
| 2,304,371 | 12/1942 | Queneau et al. | 428/610 |
| 2,386,951 | 10/1945 | Howe | 428/941 |
| 2,765,520 | 10/1956 | Donley | 428/741 |
| 3,658,488 | 4/1972 | Brown et al. | 384/912 |
| 3,753,695 | 8/1973 | Lloyd | 428/610 |
| 3,869,261 | 3/1975 | Katsuma | 428/941 |
| 4,795,682 | 1/1989 | Turner et al. | 384/912 |
| 4,957,822 | 9/1990 | Steeg et al. | 384/912 |
| 5,093,207 | 3/1992 | Hodes et al. | 428/614 |

FOREIGN PATENT DOCUMENTS

| | | |
|---|---|---|
| 0120553A2 | 10/1984 | European Pat. Off. . |
| 155257 | 9/1985 | European Pat. Off. ............ 384/912 |
| 1077026 | 3/1960 | Fed. Rep. of Germany . |
| 2722144 | 10/1979 | Fed. Rep. of Germany . |
| 3430945 | 3/1986 | Fed. Rep. of Germany . |
| 61-99648 | 5/1986 | Japan . |
| 62-20915 | 1/1987 | Japan . |
| 561446 | 5/1944 | United Kingdom . |
| 601173 | 4/1948 | United Kingdom . |
| 738228 | 10/1955 | United Kingdom . |
| 750557 | 6/1956 | United Kingdom . |
| 832396 | 4/1960 | United Kingdom . |
| 2114156B | 8/1983 | United Kingdom . |

OTHER PUBLICATIONS

Translation of German Auslegeschrift 1,077,026, Mar. 1960.

Primary Examiner—John Zimmerman
Attorney, Agent, or Firm—Herbert Dubno; Andrew Wilford

[57] ABSTRACT

Highly wear-resistant sliding bearings with good sliding properties are difficult to manufacture by electrochemical deposition of the sliding alloy, because the corresponding electrolyte solutions are unstable. Conventional sliding alloys are also too hard for a run-in period and wear too rapidly when used in accordance with specifications. The new sliding layer is simple to manufacture and has an extremely favorable run-in period. The soft constituent of the sliding layer is present in a concentration which decreases along a concentration gradient perpendicular to the effective surface of the sliding layer as the distance from the effective surface increases. The sliding layer is particularly suitable for use as a lead-tin-copper alloy in a multilayered bearing.

18 Claims, 2 Drawing Sheets

HIGHLY WEAR-RESISTANT OVERLAY WITH IMPROVED SLIP AND A METHOD OF ITS PRODUCTION

CROSS REFERENCE TO RELATED APPLICATIONS

This application is a national phase of PCT/DE91/00079 filed Jan. 26, 1991 and based, in turn, upon German national application P 40 03 225.6 filed Feb. 3, 1990 under the International Convention.

FIELD OF THE INVENTION

The invention relates to an overlay of an alloy comprising at least one soft component, particularly in a multilayer plain bearing. The invention also relates to a method for producing such an overlay.

BACKGROUND OF THE INVENTION

Essential requirements on a modern plain bearing are high thermo-mechanical load-bearing capacity and a good slip. The first mentioned feature requires a material having a high thermal stability and strength, while soft materials are to be used for a good slip in the region of slide velocities from 15 m/s and above. These requirements are met particularly by multilayer bearings having a soft overlay and a very strong bearing metal layer of bronze or aluminium materials. The overlay which has a particularly good slip is composed, depending upon the method of manufacture, mostly of lead with 8-20% by weight of tin and 2-6% by weight of copper, while occasionally also up to 10% by weight of copper and other metals may be included. Other overlays are also known, such as SnSb7-alloys or PbIn6-alloys.

Such a plain bearing is described in DE-PS 27 22 144. The overlay of the bearing described therein is lead-based with 10-20% by weight of tin and up to 10% by weight of copper. It has been found that permanent load-bearing capacity may be increased with a higher content of copper and tin. It has also been shown, however, that this overlay may be produced by electrochemical deposition only with difficulties, because electrolytic solutions containing a high proportion of Sn are unstable and that the increase of permanent load-bearing capacity is followed by increased hardness so that increased abrasion of the shaft may take place. It is therefore desirable to increase the proportion of tin in the overlay.

OBJECTS OF THE INVENTION

It is the principal object of the present invention to provide an improved overlay for a plain bearing which overcomes drawbacks of prior art overlays and particularly those described above.

Another object of the invention is to provide an overlay, particularly for multilayer plain bearing, which is highly wear-resistant and has also an improved slip.

It is also an object to provide a bearing overlay with which, as far as possible, the improved slip should last for the entire lifetime of the overlay and should have advantageous effect particularly during the running-in time of the plain bearing.

The new overlay should also be simple and capable of being made by conventional methods, such as electrochemical deposition.

It is also an object of the invention to provide a method for the production of such an improved overlay.

SUMMARY OF THE INVENTION

As regards the overlay, the objects are achieved in that one of the soft components in the overlay is present in a concentration gradient perpendicular to the effective surface of the overlay, namely concentration which decreases with distance from the surface.

As regards the method, the objects are achieved in that a further layer of a soft component is applied on the side of a base overlay and this further layer of a soft component is diffused by thermal treatment at least partly, preferably mostly or entirely into the base overlay so that an overlay is obtained with a concentration gradient of the soft component in which the concentration decreases from the side of the sliding surface to the opposite side of the overlay.

Substances are used as the soft component which can be alloyed and have a good slip, such as tin, antimony, and also lead, indium, thallium etc.

It is known that in modern plain bearings, particularly in multilayer plain bearings, the overlay which has specially good slip should be preferably only up to 20 $\mu$m thick, because with increasing thickness the relative dynamic load-bearing capacity (fatigue strength) of the overlay decreases. A typical overlay of this known kind is a lead alloy with about 8-12% tin and 2-6% copper. The microhardness of such a layer of HV 12-20 (at 20° C.) is extremely soft, but due to the small layer thickness the overlay can take up very high specific alternating loadings.

According to the invention the overlay has a concentration gradient of a soft component which increases towards the effective surface of the overlay which has good slip, in the above case tin. The concentration gradient may be so chosen that the tin content continuously increases towards the effective surface (sliding surface) over the whole layer thickness, which is normally 10 to 25 $\mu$m, and amounts in the middle of the whole layer to about 12-16% by weight. The result of this concentration gradient is that the overlay has on the sliding surface a lower microhardness but better slip so that the properties of the bearing are again better than those of an overlay without concentration gradient, without a very small fatigue strength being obtained. This is achieved in that the extremely soft thickness region of the overlay is exceptionally thin.

Also altogether thicker overlays with concentration gradients are possible. According to the thickness of the overlay the concentration gradient need not extend through the whole layer. For plain bearing applications it is only essential for the soft overlay to be relatively thin.

It has been found that running-in behavior of engines was improved by the concentration gradient of the soft component in the overlay. In addition it has been found to be particularly advantageous that according to the invention the concentration gradient of the soft component determining the slip has a beneficial effect during the running-in phase of the bearing so that higher concentration of the well sliding component is present on the sliding surface of the overlay. It is also advantageous that the diffusion process continues under the operating temperature in the running-in phase and diffuses the region of increased concentration of the slip-determining soft component into the whole overlay.

The soft component thereby migrates from the wear front more deeply into the overlay and thus continuously forms a particularly good sliding surface.

Known overlays which are equipped with a thin tin flash do not possess this advantage. This known tin flash, which is a protective layer only a few μm thick on plain bearings, serves in the known plain bearing for surface protection against oxidation and improves the visual appearance of the sliding surface. On first putting of the plain bearing into service the tin flash is worn away by the shaft because it is too soft. A certain improvement of the running-in behavior may be achieved by the tin flash but the running-in layer proper is the overlay situated below the tin flash, mostly a ternary layer (alloy of three metals), which enables geometrical adaptation of bodies in frictional contact. A tin flash cannot bring about the advantage that practically for the whole running time of the plain bearing a markedly increased concentration of the soft component is present in the overlay, because the tin flash is abraded when the plain bearing is put into service.

The overlay according to the invention may be so made that the soft component, preferably tin, applied on the base alloy is not fully diffused-in so that even in this case a tin flash (having the same properties as mentioned above) remains on the surface of the overlay. The soft component applied on the base alloy should be preferably fully diffused-in but in this case also a tin flash can subsequently (after thermal diffusion) be deposited.

Lead-tin-copper alloys with tin concentration increasing towards the effective surface of the overlay are preferably used for overlays. Also lead-indium alloys with indium concentration increasing towards the sliding surface may be used. These alloys have good properties for bearings even without the concentration gradient of the soft component and may be produced in a manner known per se/ this applies particularly to the lead-tin-copper alloy.

The invention may be used with twin-layer bearings, e.g. with a PbIn overlay, but is particularly advantageous for use in multilayer plain bearings, in which the overlay is applied separately through an intermediate layer over a bearing metal layer situated on a backing.

A preferred embodiment is a multilayer plain bearing on a steel backing which may have a thickness of 1 to 10 mm. The multilayer plain bearing has in this case preferably a bearing metal layer of lead-bronze which is copper-based, is situated on a backing and contains 22% by weight of lead and 1.5% by weight of tin. On the bearing metal layer is situated an intermediate layer which is preferably of nickel, and on this is deposited a lead alloy with a tin gradient having a mean tin concentration of 8–20% by weight, preferably 12–16% by weight, and a mean copper content of about 2–6% by weight. The intermediate layer has a thickness of 1–3 μm and serves as a dense bottom (barrier) for the overlay, so that the tin cannot migrate from the overlay into the bearing metal layer. The bearing metal layer has normally a thickness of 0.2–0.5 mm and the overlay a thickness of 10–25 μm.

Also other barriers, such as CuSn layers (e.g. CuSn 40) may be used as intermediate layers. Other bearing alloys may also be used as the bearing metal layer, e.g. AlSn alloys, such as AlSn20.

The overlay according to the invention is most simply obtainable by electro-chemical deposition of two different metal layers, for which are deposited first a base overlay and on it a further layer of the soft component. Then the further layer of the soft component is allowed to diffuse at least partly, preferably mostly or entirely, into the base overlay by temperature treatment (thermal diffusion), so that the overlay with the concentration gradient of the soft component according the invention is obtained, which decreases from the effective side to the opposite side.

It is important to deposit the base overlay and the further layer of the soft component in a thickness that is as uniform as possible and to make the resulting soft overlay as thin as possible so that the relative dynamic loading is relatively high (see FIG. 3).

It emerged that the method is suitable for producing very simply lead-copper-tin alloys, containing a high proportion of lead, for plain bearings having 8–40% by weight of tin and 2–12% by weight of copper: for this purpose a base overlay, which contains the desired quantity of lead and copper, is electro-chemically deposited, if possible with a low tin content, on it is deposited a tin layer and the latter is diffused by thermal diffusion into the base overlay so that the tin content in the base overlay is correspondingly increased and the lead and copper content is relatively reduced. The base overlay has preferably a tin content of 8–12% by weight and Cu content of 2–6% by weight. With the given copper content corresponding overlays having more than 12% by weight of tin may be made by a purely galvanic method only with difficulty, because the corresponding galvanic solutions are not stable.

The method is advantageously carried out in that the base overlay is deposited to have a thickness of 10–25 μm and the tin layer to have a thickness of 1–5 μm.

In principle the plain bearings of the invention are best used in multilayer bearings, whereupon a further bearing metal layer is used which consists mostly of lead bronze. Such three-layer bearings exhibit a high operational safety and good emergency running characteristics because the overlay may embed foreign matter and on abrasion of the overlay the lead bronze below it can ensure sufficient sliding. Instead of the lead bronze also and aluminum bearing layer may be used which contains as a slide component e.g. embedded tin.

BRIEF DESCRIPTION OF THE DRAWINGS

The above and other objects, features, and advantages will become more readily apparent from the following, reference being made to the accompanying drawing in which.

SPECIFIC DESCRIPTION

Figure 1:
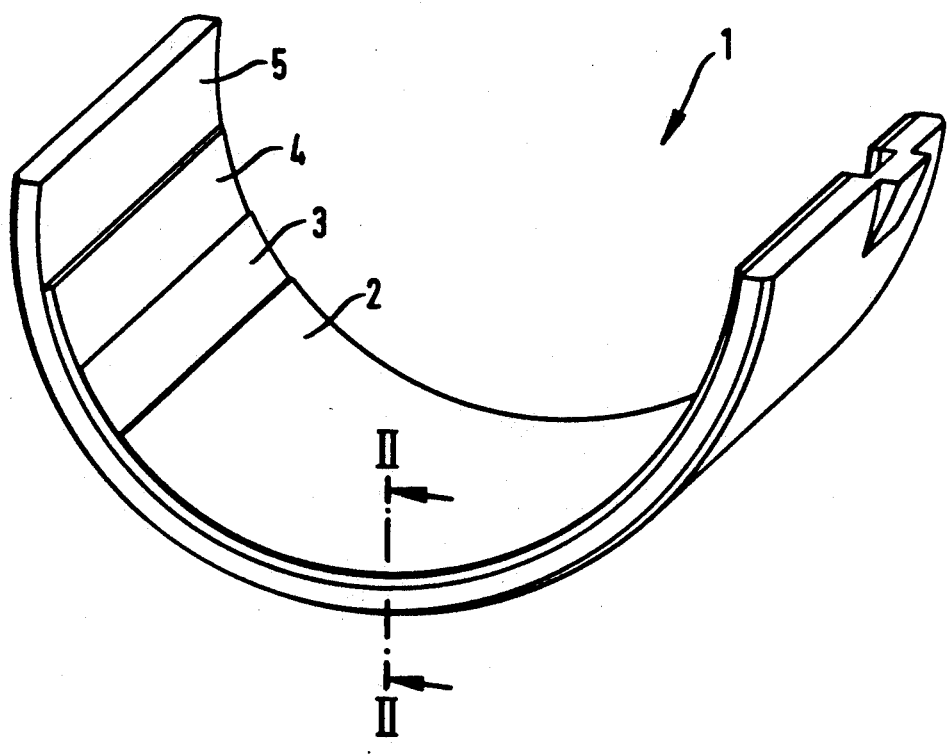
FIG. 1 is a perspective view of a bearing half-liner with a partial elevation of the individual layers.

FIG. 1 shows the construction of a multilayer bearing 1 with an overlay 2 according to the invention. The overlay 2 is, via an intermediate layer 3, which is a nickel barrier, deposited onto a bearing metal layer 4 of lead bronze, which is cast onto a steel backing 5. An aluminum layer may also be used instead of the lead bronze layer and a copper-tin barrier instead of the nickel barrier.

The individual layers have the following thickness, ranges of thickness for further advantageous embodiments being given in brackets:
steel backing 4 mm (1 to over 10 mm)
bearing metal layer 0.3 mm (0.2–0.5 mm)
intermediate layer 2 μm (1–3 μm)
overlay 17 μm (10–25 μm)

The bearing metal layer 4 is preferably a CuPb22Sn1.5 alloy, cast by conventional methods onto a steel strip or a steel tube.

The intermediate layer 3 and the base overlay as well as the pure tin layer may be deposited directly onto the bearing metal layer 4, or preferably onto a bearing liner blank made of the steel strip or steel tube and has therefore a surface which is more suitable and smoother for the deposition of further layers.

The overlay 2 is made as follows:

Onto the intermediate layer 3 is electroplated a ternary overlay having a low content of tin (base overlay) of PbSn12Cu6 of a thickness of about 16 μm (preferably thickness between 10–20 μm). Onto this ternary overlay is also electroplated a 1 μm (0.5–5 μm) thick layer of pure tin and by a following thermal diffusion tin is caused to penetrate into the ternary base overlay which has less tin. The thermal diffusion takes place at temperatures between 100° and 150° C., the diffusion time being 10 min up to 4 h. The resulting overlay 2 has an average composition PbSn17Cu5.5. Tin enrichment of the base overlay is thereby achieved, the greatest tin enrichment being at low diffusion temperature and short diffusion time on the outer side of the overlay 2 which is later brought into slide contact with a shaft or a corresponding other object and in a concentration gradient decreases in the direction towards the intermediate layer side of the overlay 2.

The ternary slide layers (overlays 2) rich on tin made in this way have preferably a composition of 4–6% copper, 12–17% tin, the rest being lead.

The diffused-in tin in the overlay 2 (ternary slide layer) of the multilayer bearing 1 is preferably so distributed that a higher tin content may be found in the later sliding surface, which decreases towards the intermediate layer 3. This distribution of tin with enrichment at the surface of the plain bearing brings about, particularly during running-in, exceptionally advantageous conditions.

Figure 2:
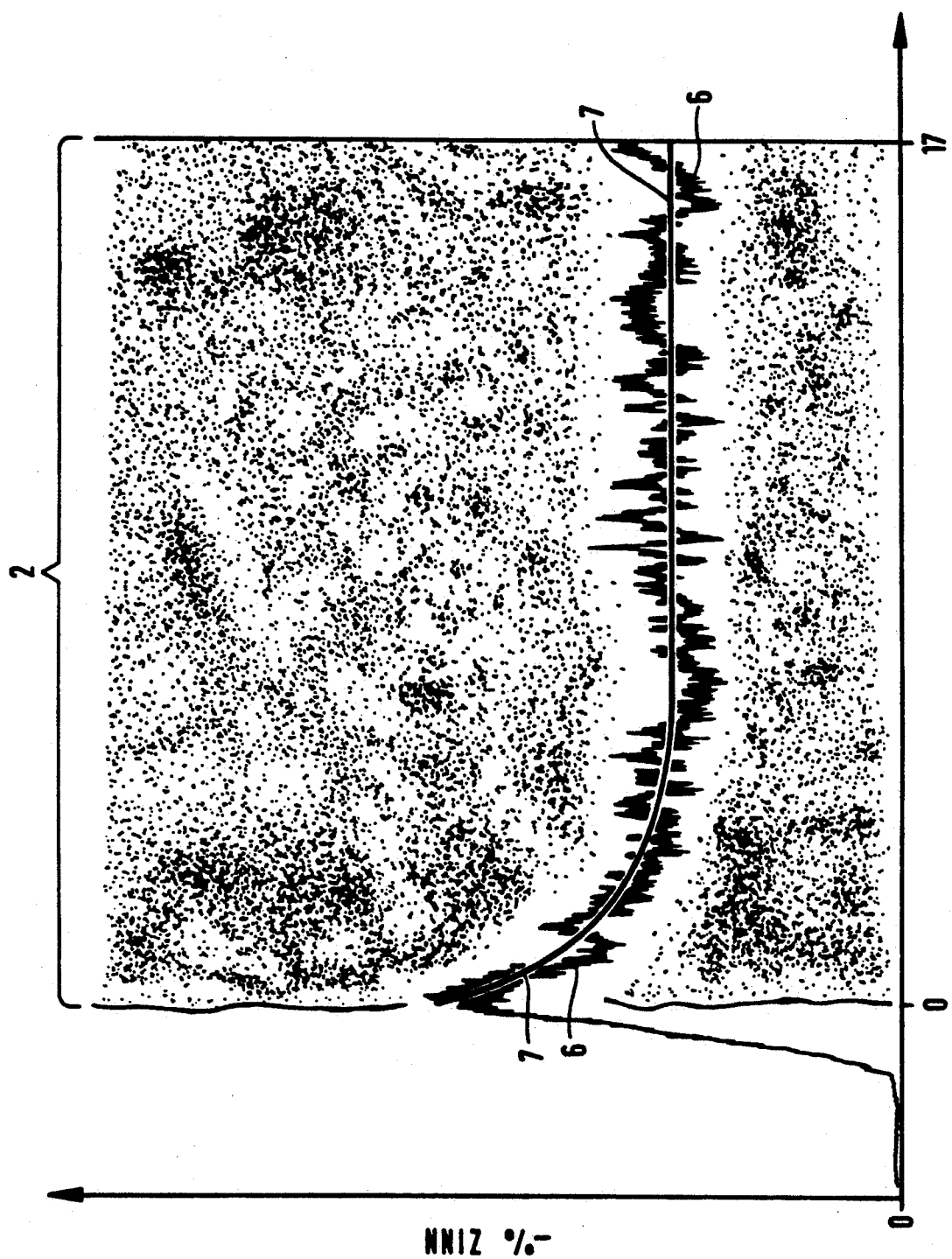
FIG. 2 a representation of a micrograph in section along line II—II in FIG. 1 through an overlay with a concentration gradient of a soft component.

FIG. 2 shows a photograph made with the use of an X-ray electron microscope of an overlay 2 of the multilayer plain bearing 1—the overlay being as described above—the tin concentration 6 being blended into the picture from which the average tin concentration gradient 7 in the overlay 2 is apparent.

Figure 3:
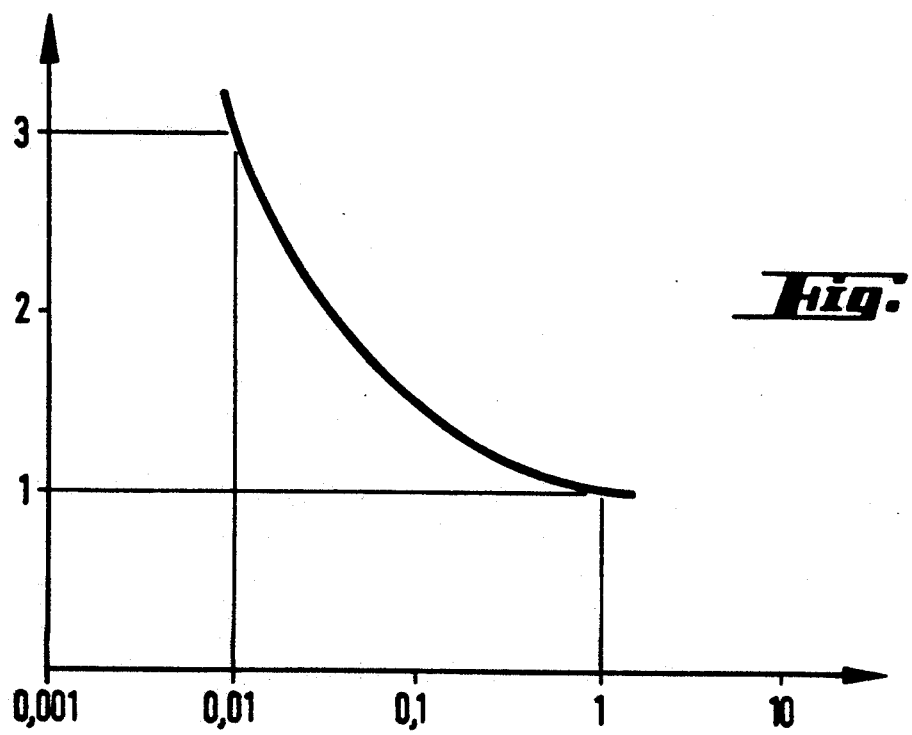
FIG. 3 a graph of the influence of the layer thickness on the fatigue strength of overlays.

The diagram in FIG. 3 shows why, in the overlay 2 according to the invention, the region with a high proportion of tin, which is correspondingly also very soft, should be very thin. The thinner is the overlay, the greater is the relative dynamic load-bearing capacity which it can take up. If, for instance, the relative thickness of the overlay is only one hundredth of the thickness of a corresponding overlay, in which—on increasing of the layer thickness—no change of the relative dynamic load-bearing capacity (fatigue strength) of the thin layer is three times greater than that of the corresponding thicker layer. Because this increase of the relative dynamic load-bearing capacity is dependent on various factors, such as composition of the alloy, it is recommended for use as an overlay to find the optimum thickness of the overlay according to the invention and the optimum course of the concentration gradient as overlay in experimental series. The above values exhibit significant improvements in wear compared with the state of the art and may serve as reference values and starting point.

As described above, it has been established in bench tests that the overlays according to the invention which may be made by a new method and which are preferably of a lead-tin-copper alloy, may be advantageously used as materials for plain bearings in internal-combustion engines, where they have shown to be extremely wear-resistant. These new plain bearing materials are suitable for internal-combustion engines such as suction engines, injection engines, diesel engines and turbo-variants. The metallic overlay according to the invention may be advantageously used also with shafts of nodular cast iron. The distinctive feature of this material resides in that a particularly high content of tin is present in the ternary overlay on the sliding surface which is responsible for the good slip of the material. As described above, also other variants of the embodiment may successfully be used.

We claim:

1. An overlay for a plain bearing, the overlay comprising a layer of a binary or ternary alloy of at least two different elements one of which is selected from the group which consists of copper, lead, tin, antimony, indium and thallium and an other of which is a soft metal selected from the group which consists of tin, antimony, and mixtures thereof, the base layer having a surface against which a member can slide and having a concentration of the soft metal at said surface corresponding to a pure state of the soft metal, said soft metal being present throughout the layer and having a concentration in said layer decreasing in a diffusion gradient from said surface in a direction perpendicular to said surface.

2. An overlay according to claim 1 wherein the base layer is part of a multilayer bearing.

3. An overlay according to claim 1 wherein the concentration gradient extends through the overlay continuously.

4. An overlay according to claim 1 wherein the alloy is a lead-tin-copper alloy and tin concentration in the overlay increases towards said surface of the overlay.

5. An overlay according to claim 1 wherein the base layer is applied on a backing.

6. An overlay according to claim 1 wherein the base layer is applied, separated by an intermediate layer, on a bearing metal layer which is situated on a backing.

7. An overlay according to claim 6, wherein the backing is a steel backing, the bearing metal layer is copper-based and contains 22% by weight of lead and 1.5% by weight of tin, the intermediate layer is of nickel or copper/nickel, and the overlay is of a lead alloy which has a tin gradient with a mean tin concentration of 12–16% by weight an 2–6% by weight of copper.

8. An overlay according to claim 6 wherein the backing is of steel and has a thickness of at least 1 mm, the bearing metal layer has a thickness of 0.2–0.5 mm, the intermediate layer has a thickness 1–3 μm and the overlay a thickness of 10–25 μm.

9. A method of making and operating a plain bearing, comprising the steps of:
forming on a carrier a base layer of a binary or ternary alloy of at least two different elements one of which is selected from the group which consists of copper, lead, tin, antimony, indium and thallium and another of which is a pure soft metal selected from the group which consists of tin, antimony, and mixtures thereof, the base layer having a surface against which a member can slide;

applying to said layer the pure soft metal;

heating said layer to diffuse said soft metal partly into said layer so that said layer has a concentration of said soft metal at said surface corresponding to a maximum concentration of the soft metal diffused into said layer from the pure state of the soft metal, said soft metal having a concentration in said layer decreasing in a diffusion gradient from said surface in a direction perpendicular to said surface and equal at a minimum to the concentration of the soft metal in the layer prior to application of the soft metal to the layer;

thereafter frictionally engaging said surface with said member to effect bearing wear of said layer along a wear front into the thickness of said layer and progressive thermal diffusion by friction heat of said soft metal progressively more deeply into said layer ahead of said wear front.

10. The method according to claim 9 wherein the base layer is applied onto an intermediate layer which acts as a barrier for the soft metal and which was before that applied on a steel backing.

11. The method according to claim 9 wherein a PbSn8-12Cu2-6 alloy is used as the base layer into which is allowed to diffuse a tin layer until the average tin content in the overlay is 12–16% by weight.

12. The method according to claim 9 wherein onto the base layer which has a thickness of 10–20 μm is applied a layer of the soft metal which has a thickness of 1–5 μm and is diffused into the base layer by thermal diffusion.

13. The metal according to claim 9 wherein the base layer and a layer of the soft metal are applied electrochemically.

14. The method as defined in claim 9 wherein a base overlay containing lead and copper is electro-chemically deposited, on it is applied a tin layer and the latter is by thermal diffusion diffused into the base overlay.

15. The method according to claim 14 wherein a base overlay containing lead, copper and tin with a tin content which is lower than the desired tin content of the resulting overlay is produced through deposition, after that a tin layer is produced through deposition and is then diffused into the base overlay through thermal diffusion, so that the tin content in the base overlay is correspondingly increased and the lead and copper content is relatively decreased.

16. The method according to claim 14 wherein the base overlay produced by deposition has a thickness of 10 to 20 μm and the so-produced tin layer has a thickness of 1 to 5 μm.

17. The method according to claim 15 wherein a base overlay with a content of 8 to 12% by weight tin and of 2 to 6% by weight copper is produced through deposition.

18. A bearing made by the process comprising the steps of:

forming on a carrier a base layer of a binary or ternary alloys of at least two different elements one of which is selected from the group which consists of copper, lead, tin, antimony, indium and thallium and another of which is a pure soft metal selected from the group which consists of tin, antimony, and mixtures, thereof, the base layer having a surface against which a member can slide;

applying to said layer the pure soft metal; and heating said layer to diffuse said soft metal partly into said layer so that said layer has a concentration of said soft metal at said surface corresponding a pure state of the soft metal, said soft metal having a concentration in said layer decreasing in a diffusion gradient from said surface in a direction perpendicular to said surface and equal at a minimum to the concentration of the soft metal in the layer prior to application of the soft metal to the layer.

* * * * *